Dec. 8, 1925.  1,565,176
C. MACBETH
MACHINE FOR MAKING PNEUMATIC TIRE COVERS OR CASINGS
Filed Jan. 5, 1922  2 Sheets-Sheet 1
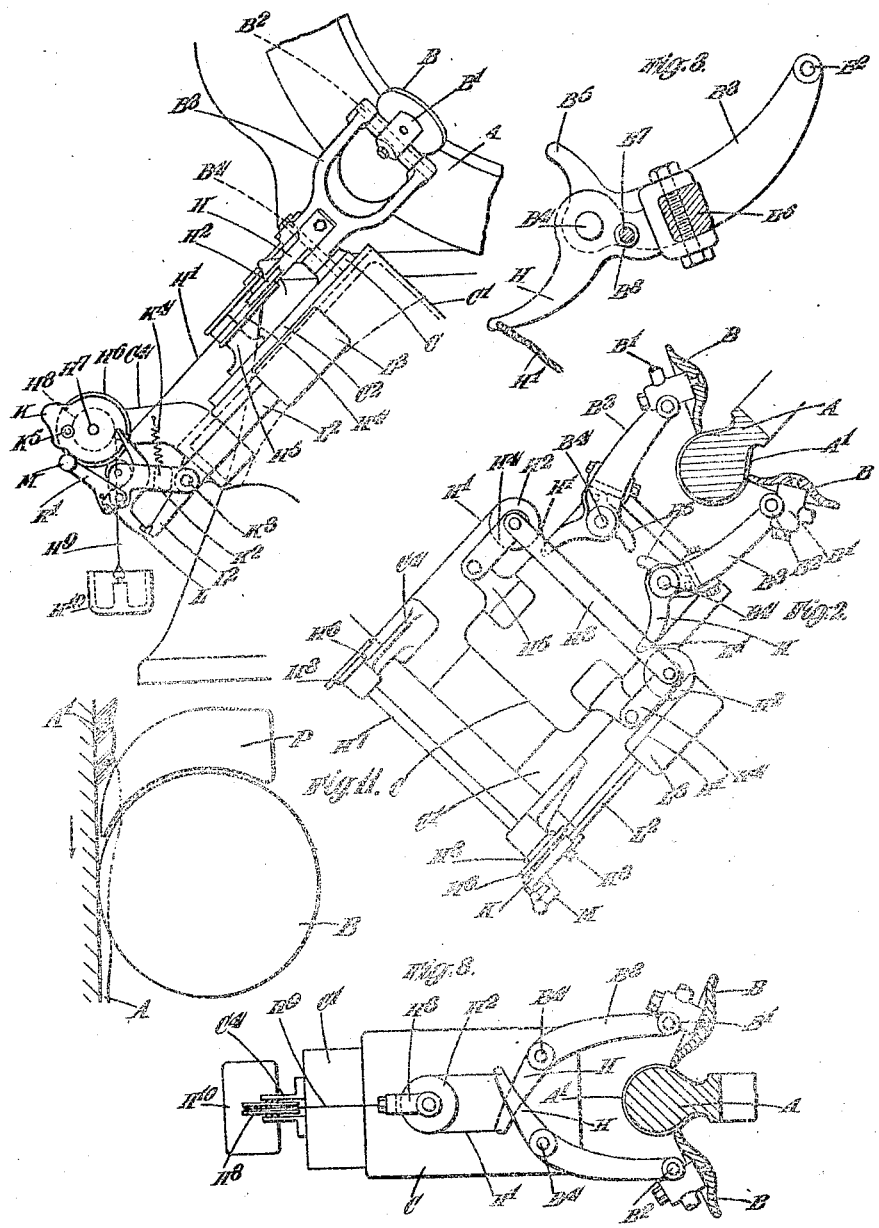

Dec. 8, 1925.
C. MACBETH
1,565,176
MACHINE FOR MAKING PNEUMATIC TIRE COVERS OR CASINGS
Filed Jan. 5, 1922   2 Sheets-Sheet 2
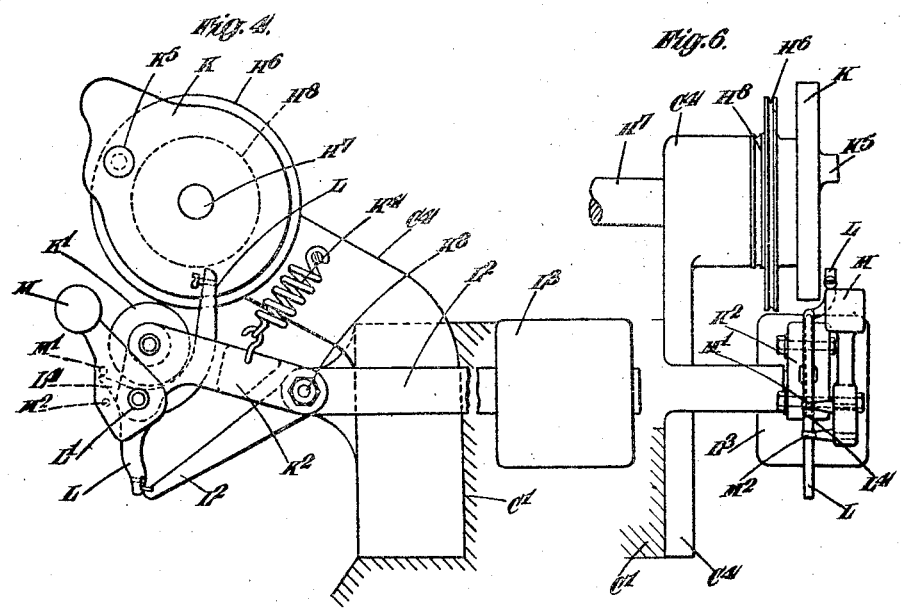
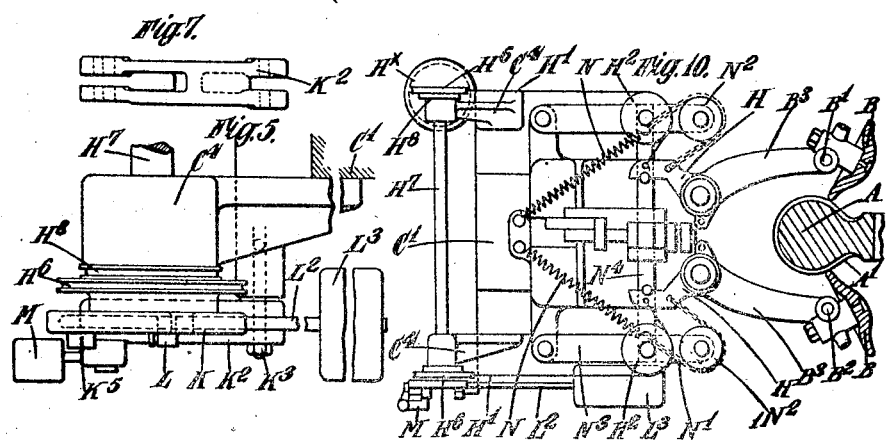
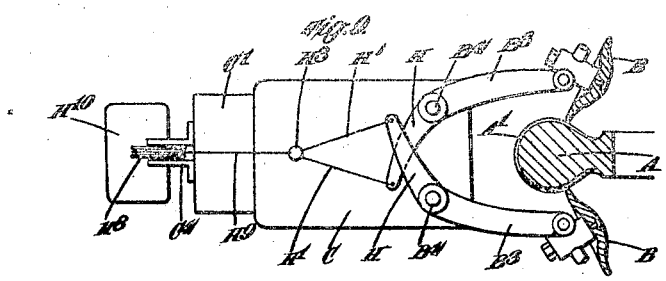

Patented Dec. 8, 1925.

1,565,176

UNITED STATES PATENT OFFICE.

COLIN MACBETH, OF BIRMINGHAM, ENGLAND, ASSIGNOR TO THE DUNLOP RUBBER COMPANY, LIMITED, OF REGENT'S PARK, COUNTY OF LONDON, ENGLAND, A BRITISH COMPANY.

MACHINE FOR MAKING PNEUMATIC-TIRE COVERS OR CASINGS.

Application filed January 5, 1922. Serial No. 527,160.

*To all whom it may concern:*

Be it known that I, COLIN MACBETH, a subject of the King of Great Britain, residing at Fort Dunlop, Erdington, Birmingham, in the county of Warwick, England, have invented certain new and useful Improvements in or Relating to Machines for Making Pneumatic-Tire Covers or Casings, of which the following is a specification.

This invention relates to machines for making pneumatic tire covers or casings, which machines are generally known as case making machines, and has particular reference to mechanism for rolling down the casing plies at the sides of the rotating core, comprising spinning or rolling down discs, which are carried by arms pivoted on a reciprocatory carriage or slide, the said arms being controlled during the operative or inward stroke to cause the discs to be maintained against the casing plies with the requisite pressure.

According to this invention, means are provided whereby the pressure with which the spinning down discs bear against the casing plies, is automatically increased when the discs are required to lay the plies over the beads which are applied after the initial plies have been rolled down on the core. During the forward or inward movement of the reciprocatory carriage or slide, the discs are caused to bear against the plies with the requisite pressure by suitable means, such as weights or springs, acting on the arms carrying the spinning down discs, and the carriage or slide in moving forward is adapted to actuate, when required, the means which cause the increased pressure to be applied to the discs for laying the plies on the beads. The said additional pressure applying means can be rendered operative or inoperative at will so that prior to the application of the beads the pressure is not increased, but after the beads have been applied the said means can be rendered operative to enable discs to bear with increased pressure on portions of the plies to be laid on the beads. The forward movement of the carriage or slide may cause a shaft, pulley or the like to rotate, and when the additional pressure applying means are required to be brought into operation the rotation of said shaft or the like is utilized to operate the said means and thus cause the increased pressure to be applied. The said shaft or the like may be controlled by a weight, which is raised by the forward movement of the slide, and this weight may be so connected to the arms carrying the spinning down discs as to cause the latter to bear on the side portions of the plies with the requisite pressure, and as previously stated, after the beads have been applied, the additional pressure applying means are actuated by the rotation of the aforesaid shaft; the said weight in being lowered during the return or outward movement of the carriage or slide restores the shaft to its initial position, so that the additional pressure applying means automatically assume the initial position ready to be operated if required by the next inward or forward strike of the carriage or slide. In a modification the said arms may be acted upon by tension springs which cause the discs to be maintained with the requisite pressure against the plies, and in this example, the aforesaid shaft which operates the additional pressure applying means may have a weight connected thereto which does not cause any appreciable pressure to be applied to the discs but merely serves to restore the shaft to its initial or normal position, after each inward movement of the carriage or slide.

Means may be associated with each spinning down disc to prevent folding back or creasing of the plies during the spinning down stroke.

In order that the said invention may be clearly understood and readily carried into effect, the same will now be described more fully with reference to the accompanying drawings, in which—

Figures 1 and 2 are respectively a front view and a plan of one construction of the means for applying pressure to the spinning down discs.

Figure 3 is an enlarged detail view hereinafter referred to.

Figures 4, 5 and 6 are respectively a front view, a plan and an end view showing on an enlarged scale that part of the mechanism used for increasing the pressure applied to the spinning down discs when contacting with the bead portions of the casing.

Figure 7 is a detail view hereinafter referred to.

Figures 8, 9 and 10 are plan views showing three modifications.

Figure 11 is a diagrammatic view of a detail hereinafter referred to.

A represents a portion of the tire core which is supported on the rotary spindle of the case making machine and A (see Figure 2) indicates a casing ply or pocket placed around the core. B B are the spinning down discs rotatably mounted on brackets B' B' angularly movable on pins $B^2$ $B^2$ at the inner and forked ends of arms $B^3$ $B^3$ which are pivoted on pins $B^4$ $B^4$ fixed on a slide C constrained to move towards and away from the core A in suitable guides on a frame or base C'. The said movement of the slide C may be effected by means such as described in the specification of my application No. 526,831 filed January 3, 1922, wherein means are also described for engaging with the projections $B^5$ $B^5$ on the arms $B^3$ $B^3$ at the end of the forward or inward movement of the slide (after the discs have rolled down the ply or plies against the sides of the core) so as to move the discs away from the core and retain them out of contact with the plies during the outward or return stroke.

For the purpose of causing the discs B B to bear on the plies A' with the requisite pressure during the inward or spinning down stroke the arms $B^3$ $B^3$ have attached thereto extensions or levers H to the outer ends of which are attached cables H' passing around pulleys $H^2$ $H^2$ mounted on a transverse "floating" bar $H^3$ which is carried by links $H^4$ $H^4$ suitably supported on brackets $H^5$ extending from the said slide C. This floating connection is provided in order to correct any misalignment of the rotating core and the spinning down mechanism. The cables H' after passing around the pulleys $H^2$ pass around and are secured to pulleys $H^6$ (mounted at right angles to the aforesaid pulleys $H^2$) on a transverse shaft $H^7$ that also carries smaller pulleys $H^8$ to which are secured cables $H^9$ carrying a weight $H^{10}$ which as shown by dotted lines in Figure 1 may be in the form of cup or trough in order that it may be loaded with shot as required to vary the weight or load on the aforesaid cables. The transverse saft $H^7$ is rotatably mounted in brackets $C^4$ secured to a fixed part of the base or frame C' so that during the forward or inward movement of the slide C carrying the spinning down discs, the cables H' are pulled by the forward movement of the pulleys $H^2$ so as to cause the transverse shaft $H^7$ to rotate against the influence of the weight suspended on the said shaft in the manner aforesaid. As a result of the forward movement of the slide C the spinning down discs are caused to exert the desired pressure on the ply or plies A' by reason of the pull exerted on the cables H' and on the levers H forming part of the arms $B^3$ which carry the spinning down discs. The pressure with which the spinning down discs bear on the plies can be varied as required by adding shot to or removing it from the aforesaid trough-shaped weight $H^{10}$. The connection between each arm $B^3$ and the lever H may be effected by a rubber pad $B^6$ and a pin $B^7$ fitting in a large clearance hole $B^8$ (see Figure 3) so that the pressure applied to the lever H is transmitted to the arm $B^3$ through the said rubber pad which serves to absorb any shock due to uneven places on the casing such as joins in the plies and thus prevent vibration or "lag" of the weight such as would cause a variation in the pressure applied to the spinning down discs. When the spinning down discs are to travel over the ply or plies laid on the beads it is desirable that the contact pressure of the discs should be increased and for that purpose means are provided for increasing the tension on the cables H' automatically upon the spinning down discs reaching the bead portions. In the example shown see particularly Figures 4 and 5, a cam K is secured on the transverse shaft $H^7$ which cam during the rotation of the shaft caused by the cables H' during the forward movement of the slide C as hereinbefore described bears against and depresses a roller K' mounted in a forked lever $K^2$ pivoted on a suitably supported pin $K^3$ the said forked lever $K^2$ being connected by a spring $K^4$ to the bracket $C^4$ so as to maintain the roller K' in contact with the cam K. The forked lever $K^2$ (shown in detail in Figure 7) also carries on a pin L' a trip lever L whose lower end is adapted to be placed into engagement with one end of a lever $L^2$ which is pivoted on the pin $K^3$ and carries at its other end a weight $L^3$. The trip lever L is adapted to depress the engaging end of the weighted lever $L^2$ when the cam depresses the roller K and the forked lever $K^2$ so that the weighted end of the lever is raised with the result that the rotation of the shaft $H^7$ is retarded so as to increase the tension on the cables H' and thus cause the spinning down discs to bear with increased pressure on the plies laid over the beads.

The increase in pressure depends upon the rate or speed of movement of the weight $L^3$ on being raised and by suitably varying the shape of the cam K any desired pressure can be obtained at any required position in the travel of the spinning down discs. After the spinning down discs have passed over the beads the weighted end of lever $L^2$ is caused to fall by reason of a projection $K^5$ on the cam K engaging with the upper end of the trip lever L which is thereby rocked on its pivot pin $L'$ so that the lower end of the trip ever is moved out of engagement with the end of the weighted lever $L^2$ thus leaving the weighted end thereof free to fall on to a rubber pad or the like (not shown in the drawings). This operation is preferably effected at the end of the inward or forward stroke of the spinning down discs whereupon the arms $B^3$ carrying the spinning down discs can be angularly moved on the pins $B^4$ for example by means engaging with projections $B^5$ $B^5$ on the arms $B^3$ $B^3$ as described in the specification of my application No. 526,831 filed January 3, 1922 in order to move the spinning down discs away from the sides of the core in which position they are maintained during the return or backward stroke. The mechanism for raising the weight lever $K^2$ may be rendered operative or inoperative as required by means of a hand actuated weighted lever M pivoted on the pin $L'$ and having two pins $M'$ $M^2$ either of which may engage with an extension $L^4$ on the trip lever L. When the lever is placed in the position shown in Figure 4 the pin $M'$ engages with the extension $L^4$ thus causing the trip lever L to assume the operative position but when the weighted lever M is moved in the opposite direction its pin $M^2$ engages with the extension $L^4$ and moves the trip lever L into an inoperative position wherein its lower end is out of engagement with the end of the weighted lever $L^2$.

The connection between the levers H on the disc arms $B^3$ and the weight $H^{10}$ may be modified as shown in Figures 8 and 9. In the example shown in Figure 8 the ends of the levers H are attached to a cable $H'$ passing around a pulley $H^2$ mounted in a forked piece $H^3$ which is connected to a cable $H^9$ passing around a pulley $H^8$ and carrying the weight $H^{10}$. In the example shown in Figure 9 the two short cables $H'$ attached to the ends of the levers H on the disc arms $B^3$ are connected to a ring $H^3$ to which is also connected the cable $H^9$ passing around the pulley $H^8$ and carrying the weight $H^{10}$ the pulleys $H^8$ in both these examples are mounted in brackets $C^4$ on the fixed base or frame $C'$ on which the slide C carrying the spinning down mechanism is adapted to be moved backwards and forwards.

Instead of employing a weight $H^{10}$ for causing the spinning down discs to bear with the requisite pressure on the sides of the core, springs may be used and an example of this kind is illustrated in Figure 10 wherein N N represent two tension springs which are attached to the slide C and are connected to chains or cables $N'$ which pass around pulleys $N^2$ and are connected to the levers H of the arms $B^3$ carrying the spinning down discs, this arrangement causes increased pressure as the disc arms $B^3$ are opened out during the forward stroke and the springs N N are made long enough to ensure that the pressure is fairly uniform over the casing up to the clinch point. The pulleys $N^2$ $N^2$ are mounted on arms $N^3$ which are pivoted to the aforesaid slide and these arms are connected by a rod or bar $N^4$ which is capable of slight endwise movement in a suitable bearing so as to provide a floating connection between the two arms $N^3$ and the spinning down discs for the purpose of correcting misalignment between the spinning down mechanism and the rotating core and permitting the discs to conform to any irregularity on the casing without causing variation of the pressure of the spinning down discs. The said arms $N^3$ also carry pulleys $H^2$ and cables $H'$, connected to the levers H, pass around these pulleys $H^2$ and are secured to pulleys $H^6$ on a transverse shaft $H^7$. A balance weight $H^x$ is also suspended from a pulley $H^8$ on the said shaft. During the forward movement of the slide C when the aforesaid springs cause the spinning down discs to bear with the requisite pressure on the casing plies, the pulleys $H^2$ are carried forward so that the pull on the cables $H'$ causes rotation of the transverse shaft $H^7$ so that the means for exerting increased pressure on the plies laid over the bead cores can be operated as hereinbefore described in connection with the example illustrated in Figures 1 to 5. The balance weight $H^x$ is provided for effecting reverse rotation of the shaft $H^7$ on the return stroke of the spinning down discs. In order to prevent the plies from folding back or being creased during the spinning down stroke, means may be associated with each spinning down disc for causing a jet of air to impinge on the loose portion or the ply radially in advance of the spinning down disc; for this purpose a pipe to which air may be supplied in any suitable manner may be carried on the bracket $B'$ and bent round the spinning down disc with its nozzle or discharging end suitably inclined to direct the air on to the loose portion of the ply in advance of the said disc. Instead of employing a jet of air for preventing folding back or creasing of the ply a metal shield or wiper plate P (see Figure 11) may be mounted on the bracket $B'$ (or a suitable part fixed thereon) in a position above the spinning down disc and preferably in the plane of the disc, the inner end of the said wiper plate P being suitably curved to form a bearing surface which may engage with the ply on the rotating core prior to the spinning down disc making contact with the ply. Owing to the wiper plate P being carried on the bracket B' or a part fixed thereon it partakes of the angular movement which is imparted to the spinning down disc during the operative stroke. Instead of using a single spinning down disc at each side of the core as shown, two discs may be arranged to travel along each side of the core, as described for example in the specification of my application No. 526,091 filed December 31, 1921. In such an example the spinning down disc is arranged radially in advance of a second disc which may be directly connected, geared or frictionally connected to the spinning down disc. The second disc which has a good grip on the rotating core, serves to rotate the spinning down disc as described in the specification of my aforesaid application No. 526,091; the spinning down disc and the second or driving disc may be mounted on a frame or yoke adapted to swivel in a forked and pivoted arm, which is mounted on the reciprocatory slide C so that by reason of the "two point contact" afforded by the spinning down disc and the driving disc bearing on the core, the contour of the latter acts as a cam for controlling the angularity of the discs during the spinning down stroke. The air jet or the metal shield for preventing folding back or creasing of the plies may be used in the example in which the spinning down disc is associated with a second or driving disc as hereinbefore referred to.

What I claim and desire to secure by Letters Patent of the United States is:—

1. Spinning down mechanism for tire making machines comprising spinning down members, a reciprocatory carriage on which said members are mounted, means for causing the said members to bear against the casing plies on the core with the requisite pressure, and means automatically operated during the forward stroke of the said carriage whereby the pressure with which the members bear against the plies is increased when the said members are required to pass over the portions of the ply or plies to be laid on the beads of the casing being built up.

2. Spinning down mechanism for tire making machines comprising spinning down members, a reciprocatory carriage on which said members are mounted, means for causing said members to bear against the casing plies, a rotary member connected to and rotated by said carriage when moving forward, and cam means actuated by said rotary member for automatically increasing the pressure with which the spinning down discs bear against the portion of the plies to be laid on the beads of the casing.

3. Spinning down mechanism for tire making machines, comprising a reciprocatory carriage, arms on said carriage, spinning down members carried by said arms, a weight connected to said arms, automatic means whereby the weight is raised during the forward movement of the carriage, and a cam device actuated by the said automatic means to control the pressure with which the spinning down members bear against the casing plies.

4. Spinning down mechanism for tire making machines, comprising spinning down members, means for moving said members in contact with the plies on the core, on which the tire is built up, automatic means for increasing the pressure with which said members bear against the plies, and means for rendering said automatic means operative or inoperative at will.

5. Spinning down mechanism for tire making machines, comprising spinning down members, arms carrying the spinning down members, a carriage on which said arms are pivoted, means acting on said arms to cause the members to bear against the plies with the requisite pressure, additional pressure controlling means, and automatic means operated by the forward movement of the carriage for bringing the additional pressure controlling means into operation so that the spinning down members are caused to bear with substantially increased pressure when passing over the beads of the casing.

6. Spinning down mechanism for tire making machines comprising spinning down members, arms carrying said members, a carriage on which said arms are pivoted, means acting on said arms to cause the members to bear with the requisite pressure against the casing plies, a rotary member connected to said arms by cable like means, and means operated by the rotation of the said rotary member for causing the spinning down members to bear with increased pressure on the portions of the plies to be laid on the beads of the casing.

7. Spinning down mechanism for tire making machines comprising spinning down members, arms carrying said members, a carriage on which said arms are pivoted, means acting on said arms to cause the members to bear with the requisite pressure against the casing plies, a rotary member connected to said arms by cable like means, a cam associated with said rotary member, a pivoted lever engaged by said cam, and a weighted lever operated by said pivoted lever to retard the rotation of said rotary member and increase the pressure with which the spinning down members bear on the casing plies.

8. Spinning down mechanism for case making machines, as set forth in claim 7, comprising a trip lever carried by the said pivoted lever and adapted to be operated by said cam to raise the weighted lever and also to be operated by a pin on said cam to disconnect the trip lever from the weighted lever so that the latter is rendered inoperative.

9. Spinning down mechanism for tire making machines comprising spinning down members, arms carrying said members, a carriage on which said arms are mounted, cable like means for connecting said arms to pressure controlling means and a floating bar carrying pulleys around which the cable like means pass said pressure controlling means comprising a shaft rotated by the said cable, a cam on said shaft, and a weighted lever adapted to be operated by said cam.

COLIN MACBETH.